United States Patent [19]

Allread

[11] 4,289,295
[45] Sep. 15, 1981

[54] SELF-SEALING CONNECTOR
[76] Inventor: Alan R. Allread, Jackson, Mich.
[21] Appl. No.: 958,132
[22] Filed: Nov. 6, 1978
[51] Int. Cl.³ .............................................. F16L 37/28
[52] U.S. Cl. ................................................ 251/149.2
[58] Field of Search ..................... 251/149.2; 137/320, 137/321, 322, 323

[56] References Cited

U.S. PATENT DOCUMENTS

| | | | |
|---|---|---|---|
| 2,300,483 | 11/1942 | Berger et al. ................ | 251/149.2 X |
| 2,824,755 | 2/1958 | Lamphear ....................... | 251/149.2 |
| 3,177,896 | 4/1965 | Mosher et al. ............... | 251/149.2 X |
| 4,007,909 | 2/1977 | Buseth et al. .................... | 251/149.2 |
| 4,023,584 | 5/1977 | Rogers et al. .................... | 137/68 R |
| 4,090,524 | 5/1978 | Allread et al. ............. | 137/614.02 X |

Primary Examiner—William R. Cline
Attorney, Agent, or Firm—Collins, Oberlin & Darr

[57] ABSTRACT

A valve device having a tubular body adapted to be connected in a fluid conduit system. A self-closing valve member is pivotally mounted in the passage of the tubular body, the pivotal valve member being in a position closing the passage when the device is in a disconnected state and in an open, interlocked position when the device is in a connected state. The valve member is adapted to be pivoted from a closed position to an open position and when in the open position, moved axially with respect to the passage of the tubular body to a position whereat it is supported on a retaining lip provided in the tubular body.

14 Claims, 5 Drawing Figures

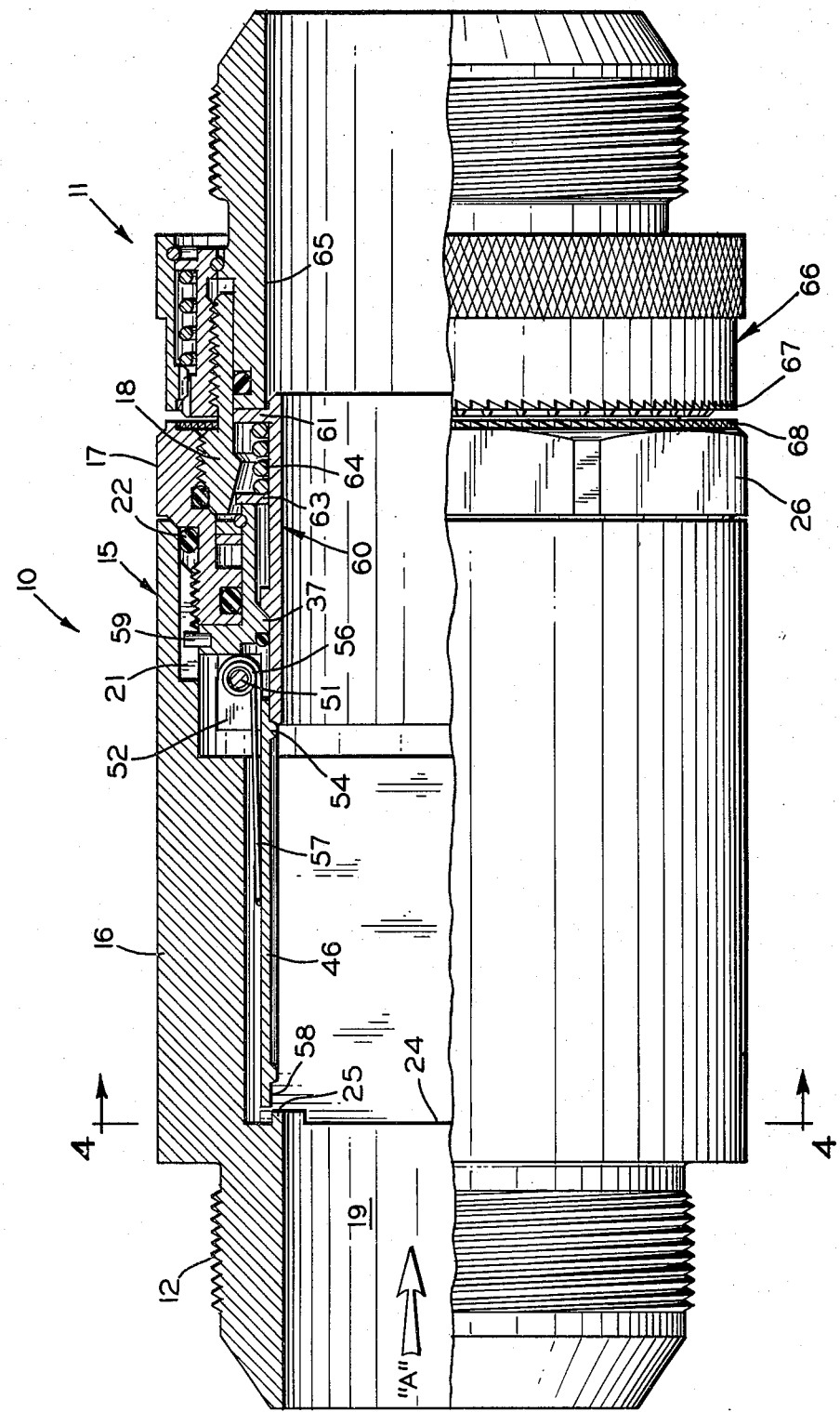

SELF-SEALING CONNECTOR

BACKGROUND OF THE INVENTION

1. Field of the Invention

This invention generally relates to self-closing couplings and, more particularly, to self-closing couplings wherein a pivotal valve member is interlocked in an open position.

2. Description of the Prior Art

While the invention has features that make it applicable for many purposes in various fields, the present disclosure is directed particularly to a valve connector for use in fluid conducting lines such as conduit systems connecting an aircraft engine to a fuel tank. As is known, aircraft engines are periodically removed from the airframes for inspection and maintenance and, accordingly, must be uncoupled from the fuel tanks. Of course, the fuel tanks must be sealed from the surrounding environment for preventing contamination of any fuel remaining in the tanks.

Fluid couplings utilizing self-closing pivoted valve members have been used in the past. Examples of such couplings are shown in U.S. Pat. Nos. 4,023,584 and 4,090,524, issued on May 17, 1977 and May 23, 1978, respectively. Although the couplings disclosed therein employ similar elements, they are of the frangible type; that is, they include valve members which are always in an open position and the valve members only move to a closed position when the frangible connection of the coupling is broken. Accordingly, once the coupling has been broken, it cannot be reused, without major repair.

SUMMARY OF THE INVENTION

In the practice of this invention, the self-sealing connector generally comprises a tubular body having a pivotally mounted, axially movable valve member disposed in its passage wherein the valve member is in a closed position when the connector is in a disconnected state and in an open, interlocked position when the self-sealing connector is in a connected state. More specifically, the valve member is pivotally mounted on an axially movable piston mounted in the passage together with an axially movable pusher which pivotally moves the valve member to an open position, after which the pusher also moves the piston and the open valve member to a position interlocking the open valve member to the tubular body.

OBJECTS AND ADVANTAGES

An object of the invention is to provide a novel valve connector which restricts the flow of fluid from one component when the connector is in a disconnected state and permits the flow of fluid between two components when the connector is in a connected state.

Another object of the invention is to provide a novel valve connector of the pivoted valve type which is self-closing in the disconnected state and interlocked in an open position in the connected state, the opened position providing a full, unobstructed fluid flow passage.

Yet another object of the invention is to provide a novel valve connector of the pivoted valve type that is simple in construction, economical to manufacture, efficient in operation and positive in action.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 3 is an elevational view, partly in section, of the valve connector partially connected to the coupling fitting and illustrating the open position of the pivotal valve member;

DESCRIPTION OF THE PREFERRED EMBODIMENT

Figure 1:
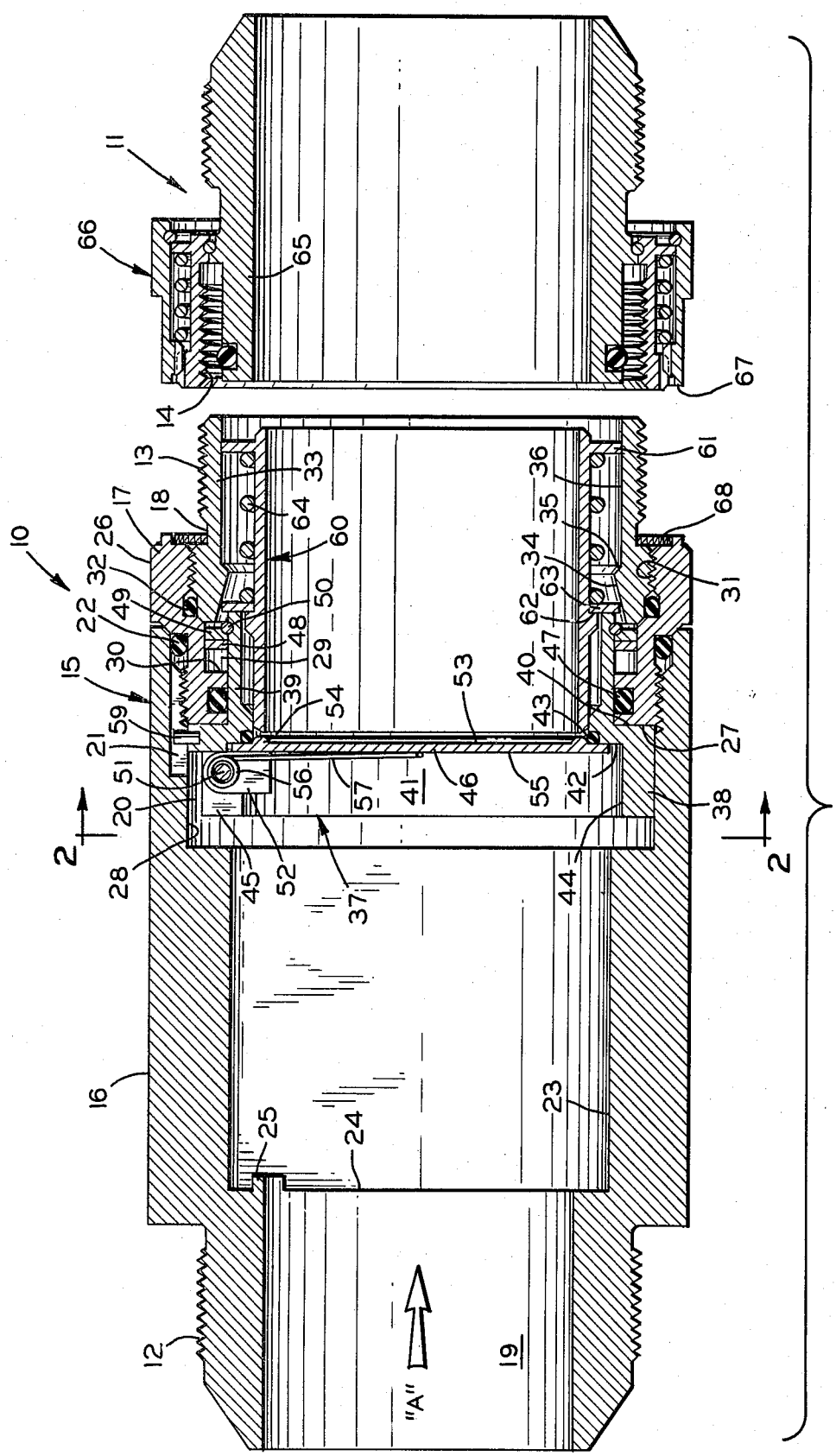
FIG. 1 is a longitudinal sectional view of a valve connector constructed in accordance with the invention together with a coupling fitting.

Referring now to the drawings, particularly FIG. 1, there is illustrated a self-closing valve connector constructed in accordance with the invention and designated in its entirety by the reference numeral 10, together with a conventional coupling fitting 11. As there illustrated, one end of the valve connector 10 is provided with external threads 12 for connection to a fitting or other component (not shown) of a piping system. The other end of the valve connector 10 is provided with external threads 13 for connection with internal threads 14 provided in the coupling fitting 11. Valve connectors constructed in accordance with the invention may be used to handle fluid flowing under pressure in piping systems wherein connection and disconnection occur quite frequently in the piping system, such connectors being used in aircraft fuel lines, hydraulic oil lines and the like.

As illustrated in FIG. 1, the valve connector 10 includes an annular valve body 15 constructed of three tubular sections 16, 17 and 18 which have an axial passage 19 extending therethrough. The passage 19 in the tubular section 16 is provided with a first counterbore 20 having an internally threaded portion for threadedly connecting the tubular section 17 thereto. An axially extending groove 21 serving as a guideway is provided in the wall defining the counterbore 20. An O-ring 22 is sealingly disposed between the two tubular sections 16 and 17 adjacent the threaded connection. Also, the passage 19 in the tubular section 16 is provided with a second counterbore 23. The inner face 24 of the counterbore is provided with an arcuate, axially extending lip 25, the radial location thereof being in an aligned relationship with the groove 21 (see FIG. 4), the purpose of which will be described in detail hereinafter.

The tubular section 17 forming an intermediate portion of the valve body 15 is of annular configuration, having a hexagonal flange 26 (see FIG. 3). As shown in FIG. 1, the face 27 of the inner end of the tubular element 17 together with the surfaces defining the counterbore 20 form an annular recess 28. Also the portion of the passage 19 defined by the tubular element 17 is provided with a counterbore 29 having an end face 30 and an internally threaded portion 31.

Still referring to FIG. 1, the tubular section 18 completing the annular valve body 15 serves as an adapter and is threadedly connected to the internally threaded portion 31 of the tubular section 17. An O-ring 32 is sealingly disposed between the tubular section 17 and the adaptor section 18 for sealing the threaded connection therebetween. It should be noted that the external threads 13, for connecting the valve connector to the internal threads 14 of the coupling fitting 11, are provided on an axially extending portion 33 of the section 18. The portion of the passage 19 defined by the section 18 is provided with an inner flared end portion 34 terminating at an intermediate abutment 35 and an outer, axially extending cylindrical end bore 36 also terminating at the intermediate abutment 35.

A movable member or piston 37 is slidably mounted in tubular sections 16 and 17 of the valve body 15. The piston 37 is of annular configuration and includes an annular portion 38 disposed in the recess 28 defined in the body section 16, and has a reduced annular shank 39 extending axially therefrom, into the passage 19 defined in the tubular section 17. The back face 40 of the annular portion 38 defines a shoulder facing in opposed relationship, the face 27 of the body section 17. The annular portion 38 of the piston 37 includes a bore 41, the inner face 42 of which contains an O-ring 43 and defines a flat valve seat. An annular wall 44 defines the bore 41 and is provided with a groove 45 for pivotally mounting a flat flapper valve 46. An O-ring 47 is disposed in the cylindrical passage of the tubular section 17 and surrounds the shank 39 of the piston 37 for sealing the slidable connection therebetween.

Resilient means such as an annular wave washer 48 surrounding the shank 39 of the piston 37 is disposed in the counterbore 29 of the body section 17 in abutting relationship to the face 30 thereof. The wave washer 48 exerts a biasing force between the face 30 and a retainer ring 49 slidably mounted on the shank 39 of the piston. A retainer wire 50 mounted on the piston shank 39 secures the retainer ring 49 thereon. Accordingly, the wave washer 48 urges the shoulder 40 of the piston axially in a first direction against the inner face 27 of the tubular section 17 to a first position as shown in FIG. 1.

Figure 4:
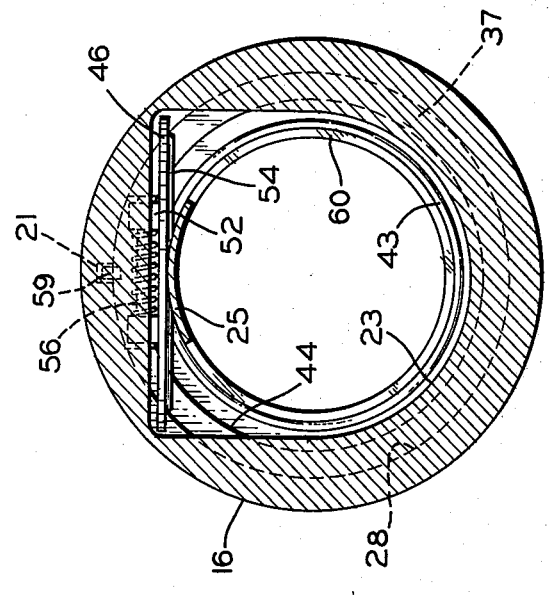
FIG. 4 is a transverse cross sectional view taken substantially along line 4—4 of FIG. 3.
Figure 2:
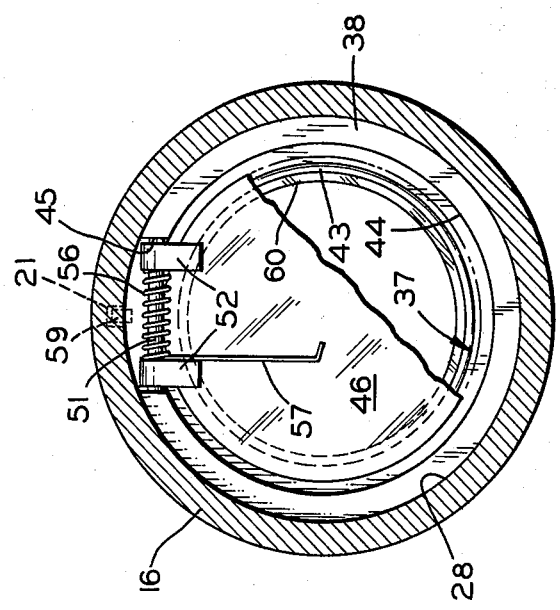
FIG. 2 is a transverse cross sectional view taken substantially along line 2—2 of FIG. 1.
Figure 5:
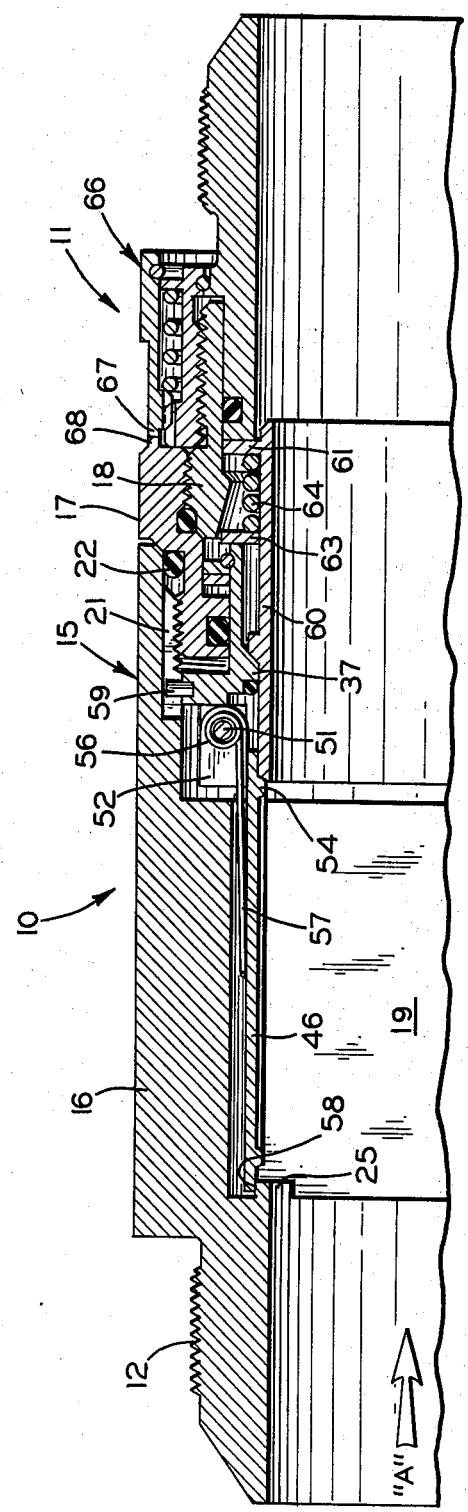
FIG. 5 is a fragmentary elevational sectional view of the valve connector illustrating the open, interlocked position of the pivotal valve member.

As previously indicated, the annular portion 38 of the piston 37 pivotally mounts the flapper valve 46 which closes the passage 19 when the valve connector 10 is in a disconnected state. To this end, the flapper valve 46 is pivotally mounted upon the annular portion 38 of the piston 37 by a pivot pin 51 transversely disposed to the axis of the bore 41. The flapper valve 46 is a flat member of circular configuration having a pair of lugs 52 disposed in the groove 45 (see FIG. 2) with the pivot pin 51 extending therethrough. The valve includes a side 53 having an annular shoulder 54 sealingly engaging the O-ring 43 mounted in the inner face 42 of the piston bore 41. With respect to the valve connector 10 as illustrated in FIG. 1, when fluid flows in the direction as indicated by arrow A, the side 55 of the valve 46 is exposed towards the source of fluid flowing under pressure; that is, the valve side 55 is pressurized. Accordingly, the valve 46 is biased to a closed position when the valve connector 10 is in a disconnected state, by the pressure of the flowing fluid as well as a torsion spring 56 wrapped around the pivot pin 51, which includes an end 57 bearing against the side 55 of the valve. As best illustrated in FIGS. 3, 4 and 5, the flapper valve 46 includes a portion 58 at the location diametrically across from the pivot pin 51 for cooperation with the retainer lip 25. A guide pin 59 is mounted on the periphery of the annular portion 38 of the piston 37 and extends into the valve body groove 21 and maintains the circumferential alignment of the valve portion 58 with the rib 25 on the valve body 15. It should be noted that the radial location of the lip 25 is such that when the flat valve portion 58 rests upon the lip 25 as shown in FIG. 5, the flapper valve 46 is maintained well out of the flow path defined through the valve body and the plane of the flapper valve is substantially parallel to the axis of the passage 19 through the connector 10.

Still referring to FIG. 1, valve operating means comprising an elongated pusher 60 is slidably mounted within the tubular body section 18 and the bore of piston 37. As there shown, the pusher 60 is an annular sleeve of tubular configuration having a radially outwardly extending flange 61 adjacent its outer end for slidably engaging the cylindrical surface defining the portion 36 of the body section 18. The other end of the pusher is slidably mounted in the bore of the piston 37 for axial movement relative thereto. It will be noted that the intermediate portion of the pusher 60 is provided with a radially outwardly extending shoulder 62 closely adjacent the end of the shank 39 of the piston 37. A split washer 63 serving as an abutment shoulder is slidably mounted on the pusher 60 for retaining a compression spring 64 between it and the flange 61 of the pusher 60, the spring 64 normally retaining the pusher 60 in the position shown in FIG. 1. It should be noted that this structural arrangement will move the piston 37 in a second direction, that is to the left as viewed in FIG. 5, when the spring 64 is in the "solid" state.

The coupling fitting 11 is conventional in design and includes an axially extending male portion 65 which bears against the flange 61 for axially moving the pusher 60 when the valve connector 10 is connected to the coupling fitting 11. Also, the coupling fitting may include a tongue ring assembly 66 having a circular series of ratchet teeth 67 which is spring loaded for axial movement, the teeth 67 cooperating with a facing circular series of axially extending ratchet teeth 68 provided on the body section 17 of the valve body 15 for locking the valve fitting 10 to the coupling fitting 11 for preventing separation of the coupling fitting 11 from the valve connector 10.

As illustrated in FIG. 1, the relationship between the components of the valve connector 10 is shown prior to its connection to the coupling fitting 11. As viewed therein, the force of the torsion spring 47 and fluid pressure, if any, in the passage 19 urges the valve 46 into sealing engagement against the face 42; the shoulder 40 of the piston 37 abuts the shoulder 27 on the body section 17, and the end of the piston shank 39 urges the split washer 63 into engagement with the tapered portion 34 of the body section 18. In this relationship, the compression spring 64 urges the pusher 60 to the right as viewed in FIG. 1, engaging the shoulder 62 thereon with the split washer 63 moving the end of the pusher 60 out of engagement with the valve 46. Thus, in the disconnected or uncoupled state of the valve connector 10, the valve 46 is in the position closing the passage 19.

To connect the valve connector 10 to the coupling fitting 11, it is merely necessary to engage the external threads 13 of the connector 10 with the internal threads 14 of the coupling fitting 11. With these threads partially engaged as illustrated in FIG. 3, the valve 46 is pivoted from its closed position by the end of the pusher 60. Thus, as the coupling fitting 11 is threaded onto the threads 13 of the connector 10, the end of the male portion 65 engages the flange 61 of the pusher 60 and moves the pusher 60 to the left as viewed in FIG. 3, and compresses the spring 64. It should be noted that the wave washer 48 has a greater force than the compression spring 64, thus holding the piston 37 motionless until the spring 64 is fully compressed. Accordingly, in effecting the initial interconnection of the valve connector 10 with the coupling fitting 11, the valve 46 will be pivoted to an open position by the end of the pusher 60 whereat it lays in a plane parallel to the axis of the passage 19 before the piston 37 is moved axially.

Upon further tightening of the threaded connection between the valve connector 10 and the coupling fitting 11, the "solid" state of the compression spring 64 causes the split washer 63 to bear against and move the piston 37 to a second position against the biasing force of the wave washer 48 which collapses the wave washer 48 and the piston 37 moves to the left as viewed in FIG. 5. As there shown, the portion 58 of the valve member 46 engages the lip 25 maintaining the valve 46 in an open, interlocked position upon the valve body 15 when the connector 10 is in a connected or coupled state.

It is to be understood that the form of the invention herewith shown and described is to be taken as an illustrative embodiment only of the same, and that various changes in the shape, size and arrangement of the parts may be resorted to without departing from the spirit of the invention.

I claim:

1. In a valve connector of the type having a pair of interconnectable body members, each having a central passage extending therethrough, a valve member pivotally mounted in the passage of one of the body members wherein the valve member is in a position closing the passage when the body members are uncoupled and in a position opening the passage when the body members are coupled and connecting means for interconnecting the body members, the improvement comprising:
    (a) a piston axially slidably mounted within said one body member and having a central aperture with the passage in said one body member;
    (b) said valve member being pivotally mounted on said piston over the central aperture therein and pivotal between positions closing and opening the central aperture;
    (c) means for urging said piston to a first position whereat said valve member closes the aperture in said piston when said body members are in the uncoupled state;
    (d) means for pivoting said valve member from its closed position to its open position when said body members are in the coupled state; and
    (e) means for axially moving said piston and said open valve member to a second position interlocking said valve member to said one body member when said body members are in the coupled state.

2. A valve connector having a closed passage when it is in an uncoupled state and an open passage when it is in a coupled state as claimed in claim 1, wherein said means for axially moving said piston to the second position comprises a movable tubular sleeve having an abutment shoulder bearing against said piston.

3. A valve connector having a closed passage when it is in an uncoupled state and an open passage when it is in a coupled state as claimed in claim 2, wherein said tubular sleeve includes means for pivotally moving said valve member from its closed position to its open position.

4. A valve connector having a closed passage when it is in an uncoupled state and an open passage when it is in a coupled state as claimed in claims 1 or 2, wherein said means for urging said piston to the first position comprises a wave washer.

5. A valve connector of the type having a pair of interconnectable body members, each having a central axial passage extending therethrough and connecting means for interconnecting the body members comprising:
    (a) a movable member slidably mounted within the passage of one of said body members;
    (b) means for mounting said movable member in the passage of said one body member for axial movement along a path relative to said body member between first and second positions;
    (c) means defining a valve seat in said movable member;
    (d) a valve member cooperating with said valve seat;
    (e) means for mounting said valve member on said movable member for pivotal movement about a pivot axis;
    (f) said valve member having a closed position in which said valve member is in engagement with said valve seat when said movable member is in the first position and an open position in which said valve member is spaced from said valve seat when said movable member is in the second position;
    (g) means for urging said movable member to the first position;
    (h) means for moving said movable member from the first position to the second position;
    (i) abutment means on said other body member engageable with said means for moving said movable member as said body members are coupled together; and
    (j) means for retaining said valve member in the open position when said movable member is in the second position.

6. A valve connector as claimed in claim 5, wherein said means for urging said movable member to the first position comprises a wave washer.

7. A valve connector as claimed in claim 5 or claim 6, wherein said means for moving said movable member from the first position to the second position comprises a spring biased sleeve having an abutment thereon engageable with said movable member and said abutment means on said other body member engages said spring biased sleeve.

8. A valve connector as claimed in claim 5, wherein said movable member includes means for axially aligning said valve member with said valve member retaining means.

9. A valve connector comprising:
    (a) a pair of interconnectable body members each having an axial passage extending therethrough;
    (b) means defining a valve seat in the passage of one of said body members;
    (c) a valve member in the passage of said one body member;
    (d) means for mounting said valve member in the passage for pivotal movement between a closed position in which said valve member is in engagement with said valve seat and an open position in which said valve member is spaced from said valve seat;

(e) resilient means for pivotally urging said valve member to the closed position when the body members are in a disconnected state;

(f) means for pivotally moving said valve member to an open position when the body members are in a connected state;

(g) means for axially urging said valve member in a first direction whereat said valve member is in the closed position;

(h) means for moving said valve member to the open position and axially moving said valve member along a path in a second direction away from the closed position of said valve member; and (i) retaining means for retaining said valve member in the open position, said retaining means being releasable from said valve member in response to movement of said valve member along a path in the first direction.

10. A valve connector as claimed in claim 9, wherein said means for urging said valve member in the first direction comprises a wave washer and said means for axially moving said valve member in the second direction comprises a sleeve engageable with said valve member and moved by said other body member.

11. In a valved coupling including interconnectable first and second annular body members having a central axial passage extending therethrough, a valve member pivotally mounted within the passage of the first body member and movable between a position closing said passage when said first and second body members are disconnected and a position whereat said passage is open when said first and second body members are connected, and means for connecting and disconnecting said first and second body members, the improvement comprising:

(a) a piston member axially slideably mounted within said first body member, said piston member having a central aperture extending axially therethrough, said valve member being mounted on said piston member to move axially therewith and being adapted to close said central aperture when said first and second body members are disconnected;

(b) an elongated annular pusher sleeve slideably mounted within said piston member and first annular body member;

(c) said pusher sleeve including means for first engaging and opening said valve member and thereafter moving said piston member and valve member axially along said first body member as said pusher sleeve is advanced, and sequentially reversing the movements as said pusher sleeve is retracted; and (d) means on said second body member engaging and advancing said pusher sleeve as said first and second body members are progressively interconnected and permitting said pusher sleeve to retract as said first and second body members are disconnected.

12. A valved coupling as claimed in claim 11, including lip means within said first annular body member over which said valve member projects as said piston member and valve member are advanced for interlocking said valve member in the open position.

13. A valved coupling as claimed in claim 11, including first spring means urging said piston member toward its retracted position relative to said first body member and second spring means urging said pusher sleeve toward its retracted position relative to said piston member.

14. A valved coupling as claimed in claim 13, wherein the spring resistance of said first spring means is greater than the initial spring resistance of said second spring means whereby as said pusher sleeve is advanced by said means on said second body member, said piston member remains stationary until said pusher sleeve has fully opened said valve member and the force exerted on said piston member exceeds the resistance of said first spring means, and the piston member then advances with said pusher sleeve.

* * * * *

UNITED STATES PATENT AND TRADEMARK OFFICE
CERTIFICATE OF CORRECTION

PATENT NO. : 4,289,295

DATED : September 15, 1981

INVENTOR(S) : Alan R. Allread

It is certified that error appears in the above—identified patent and that said Letters Patent are hereby corrected as shown below:

ASSIGNEE: Aeroquip Corporation
Jackson, Michigan

Signed and Sealed this

First Day of December 1981

[SEAL]

Attest:

Attesting Officer

GERALD J. MOSSINGHOFF

Commissioner of Patents and Trademarks